United States Patent [19]

Denning et al.

[11] Patent Number: 4,517,792
[45] Date of Patent: May 21, 1985

[54] GRAIN LOSS MONITOR SENSOR MOUNTING ARRANGEMENT FOR A COMBINE

[75] Inventors: Barry K. Denning, Woodhull; Duane H. Ziegler, Colona, both of Ill.

[73] Assignee: Deere & Company, Moline, Ill.

[21] Appl. No.: 375,894

[22] Filed: May 7, 1982

[51] Int. Cl.³ .................... A01F 12/44; A01F 7/06
[52] U.S. Cl. .................... 56/10.2; 56/DIG. 15; 130/27 R
[58] Field of Search .......... 56/DIG. 15, 10.2; 130/24, 27 R; 248/214, 222.2, 222.1, 205 R

[56] References Cited

U.S. PATENT DOCUMENTS

| | | | |
|---|---|---|---|
| 3,194,406 | 7/1965 | Simeti et al. | 248/222.2 |
| 3,610,252 | 10/1971 | DeCoene | 56/DIG. 15 |
| 3,638,659 | 2/1972 | Dahlquist et al. | 56/DIG. 15 |
| 3,695,568 | 10/1972 | Hogrebe | 248/222.2 |
| 4,036,065 | 7/1977 | Strelioff et al. | 56/DIG. 15 |
| 4,250,897 | 2/1981 | Glaser | 56/14.6 |
| 4,292,795 | 10/1981 | Linn | 56/14.6 |
| 4,401,128 | 8/1983 | Fisher | 130/26 |

FOREIGN PATENT DOCUMENTS 2122402 5/1973 Fed. Rep. of Germany ... 130/27 JT

*Primary Examiner*—Paul J. Hirsch

[57] ABSTRACT

A combine grain loss monitor system includes sensors adjacent the discharge ends of straw walkers and the upper sieve or chaffer of a cleaning shoe. The shoe sensor is carried in an assembly which is easily mounted on and dismounted from the chaffer without the use of tools. The mounting of the straw walker sensor includes a shield which protects the rear edge and underside of the sensor from damage by flying particles of grain and other material. Both mountings include a baffle designed so as to deflect grain onto the sensor working surface without snagging or holding longer pieces of material such as straw and husks.

7 Claims, 7 Drawing Figures

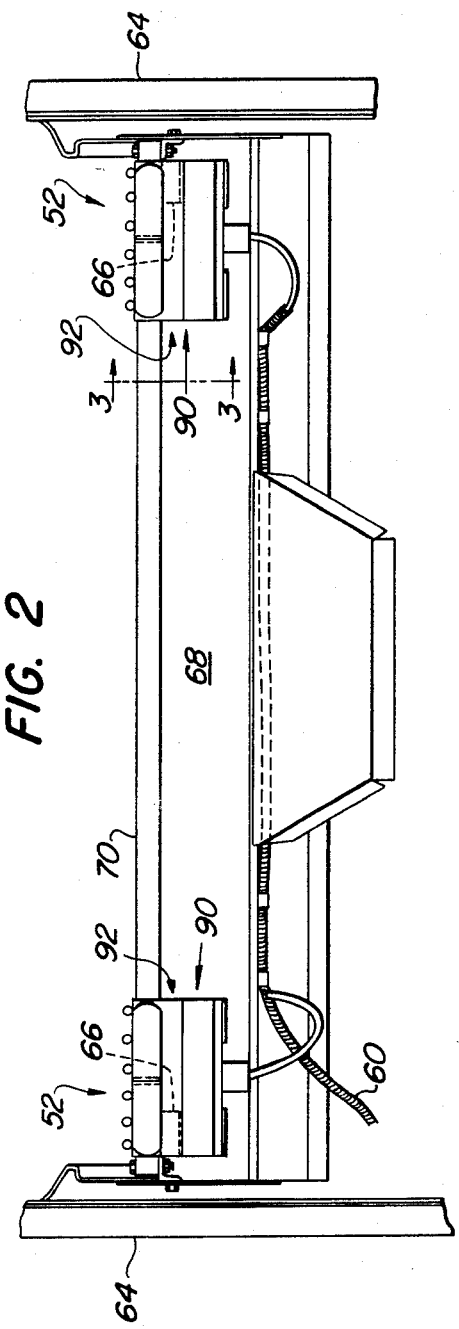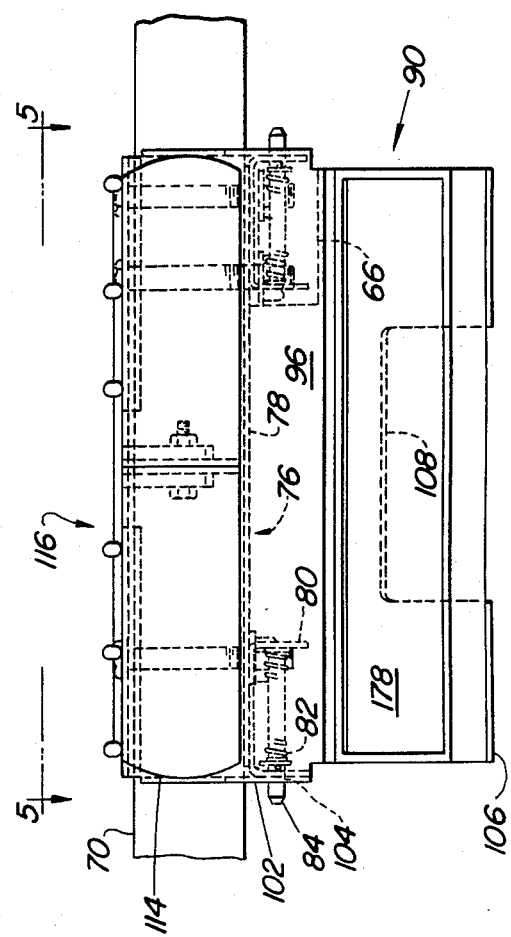

GRAIN LOSS MONITOR SENSOR MOUNTING ARRANGEMENT FOR A COMBINE

BACKGROUND OF THE INVENTION

The present invention concerns a grain loss monitor system for a combine harvester and particularly an arrangement for mounting sensors of the system.

Although grain loss monitor systems for combines are now well-known they are, in terms of the history of the combine, a relatively recent innovation. They are still fitted mostly as special rather than regular equipment and their sensors typically find themselves in a somewhat hostile environment, offering no very convenient resting place. Once mounted, parts of the sensor, especially if mounted at the discharge end of a straw walker, may in operation be subjected to a violent bombardment by grain and other particles, especially in corn harvesting and when a straw chopper is fitted. Sensors for the cleaning shoe are preferably fitted towards the sides of the shoe so as to be in a good sampling location. Their presence there typically interferes with access to the cleaning shoe for adjustment of chaffer and sieve. Until now the existence of these problems has resulted in compromise and acceptance of inconvenience tending to limit the effectiveness or utilization of the grain loss monitor. In some cases, the vulnerability and unreliability of sensor mounting arrangements has been such that the manufacturers have recommended removal of the sensors when operating in certain crops and conditions.

SUMMARY OF THE INVENTION

Accordingly, it is an object of this invention to provide a grain loss monitor system which offers increased reliability and convenience in use, in an extended range of crops and conditions.

A particular feature of the invention is to provide improved mounting arrangements for sensors of the discriminating type, mounted to sample the flow of crop material at the discharge ends of straw walkers and cleaning shoe. In keeping with the invention, a sensor for the straw walker is carried by a combination bracket and shield arrangement which provides protection for the exposed edges and underside of the sensor, and also its electrical connection, without interfering at all with its function. This arrangement is particularly valuable when a conventional straw chopper is fitted and even more so in harvesting corn when the sensor and its adjacent wiring harness portion are liable to be subjected to bombardment by corn kernels randomly discharged by the straw chopper rotor.

At the cleaning shoe, the sensor is integrated into an assembly which provides a secure and functionally suitable mounting for the sensor and which, at the same time, is easily detachable and remountable without the use of tools. The preferred location, at a lateral side of the chaffer, typically interferes with access to adjustments of the sieve which in some operations must be made relatively frequently. Easy removal of the sensors also facilitates removal of a plugged chaffer or sieve.

Both the walker and shoe sensor assemblies also include an upright deflector which serves to funnel a greater proportion of the grain coming over walker or shoe onto the sensor so as to increase the sample being sensed and hence the accuracy of the monitor reading. Preferably, the lateral portions of this deflector are cantilevered from a central support so as to provide a stripping action and minimize the amount of long material (pieces of straw, husks, etc.) becoming held or hairpinned on the deflector. The sensor mounting assembly may also include a grid or grate extending above the sensor and deflector to screen out larger pieces of crop material so that they by-pass the sensor, again with the object of enhancing the accuracy of the system.

In a preferred embodiment, the cleaning shoe sensor is carried by an upper reciprocating element of the shoe adjacent a lateral side of the shoe and in a position so that its sensing surface receives impacts from crop material passing over the discharge edge of the element. The integrated assembly, comprising the sensor and supporting parts, is mounted on the reciprocating element by inserting an offset tang of the assembly into a slot carried by the element and swinging the sensor down into a fixed operating position in which easily manually depressed spring-loaded pins engage an aperture such as a slot in the assembly, so as to hold it securely.

Thus, mounting means according to the invention, for sensors at the straw walkers and cleaning shoe potentially enhance combine operation in that grain loss monitoring may be provided in virtually all crops and conditions and in that making adjustments for "fine tuning" of the cleaning shoe is encouraged by the ease of access to shoe adjustments. When the cleaning shoe sensor or sensors are easily detached and remounted, an operator is not discouraged from making a further corrective adjustment if his first adjustment does not bring indicated grain loss into an acceptable range.

The features of the invention have been described or discussed exclusively in the environment of a conventional combine, that is one in which the crop processing after threshing is done in two stages. First, so called separation by straw walkers and secondly, cleaning of the grain in a cleaning shoe. However, it will be clear that the invention is adaptable to other configurations of combine including, for example, a "conventional rotary" combine in which the straw walkers are replaced by an axially flow rotary separator having a foraminous casing. The cleaning shoe situation remains essentially the same and a sensor positioned to sample material passing outwards through the foramina of the separator casing may also be supported in a protective mounting as described above.

BRIEF DESCRIPTION OF THE DRAWINGS

FIG. 2 is an enlarged partial rear view of the cleaning shoe area of the combine showing the general arrangement of the cleaning shoe sensors.

FIG. 4 is an enlarged partial rear view taken approximately on line 4—4 of FIG. 3 showing the installation of one of the cleaning shoe sensors.

DESCRIPTION OF THE PREFERRED EMBODIMENT

Figure 1:
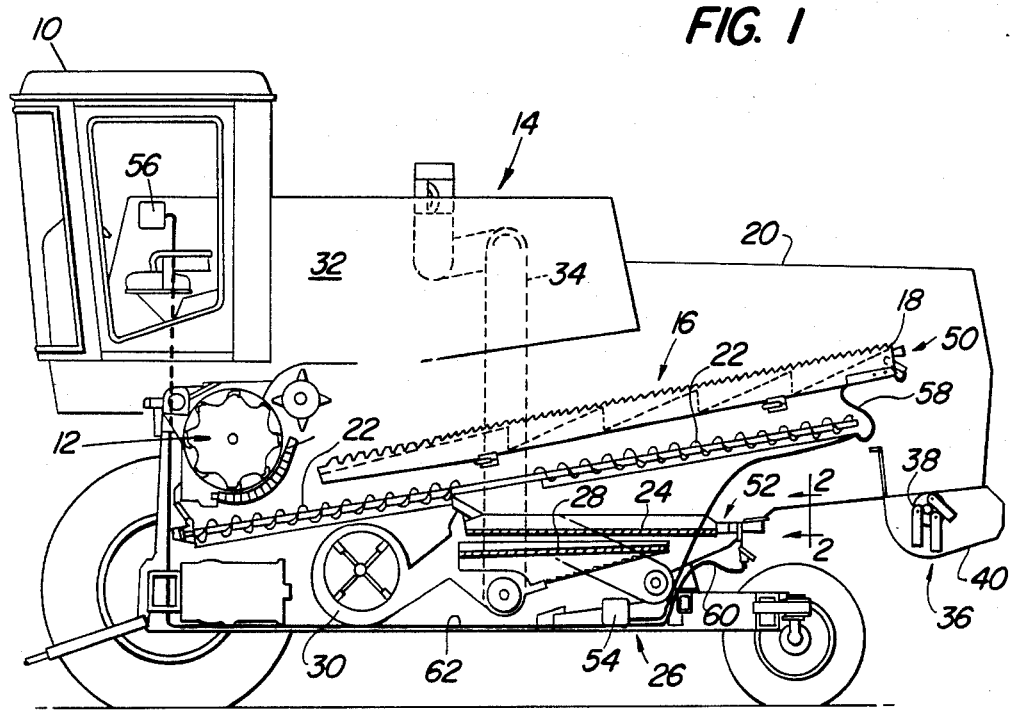
FIG. 1 is a semi-schematic left-hand side elevation of a self-propelled combine harvester embodying the invention and including grain loss monitor sensors mounted on the straw walkers and cleaning shoe.

The invention is embodied in a conventional combine harvester shown in semi-schematic side elevation in FIG. 1. The machine is controlled from an operator station 10 and as it advances, crop material is gathered by a forward mounted header (not shown) and delivered to a threshing cylinder and concave 12 carried in the body 14 of the combine. Separation of the crop material continues on straw walkers 16, the discharge end 18 of which is housed in a hood portion 20 of the combine body 14. Conveyors 22, underlying the concave and straw walkers 16 deliver separated material to the upper sieve element or chaffer 24 of the cleaning shoe 26. Cleaning of the crop is completed on the lower reciprocating shoe element (sieve 28) assisted by blower 30. Cleaned grain is collected and delivered to the grain tank 32 by clean grain elevator 34. The hood 20 confines straw discharged from the walkers 16 and directs it downwards into a straw chopper 36 in which a transversely mounted rotor 38 cooperates with the housing 40 to chop the straw and discharge it generally rearwardly.

The general arrangement of the grain loss monitor system, as indicated schematically in FIG. 1, includes straw walker sensor assemblies 50 and cleaning shoe sensor assemblies 52, and a pre-amplifier and filter circuit assembly 54 located as close as feasible to the sensors 50, 52 so that the best possible signal is sent to the indicator console 56 at the operator station 10. Suitable wiring harnesses 58 and 60 respectively, connect the walker and shoe sensors to the preamp unit 54 which is connected to the console 56 by harness assembly 62.

Figure 3:
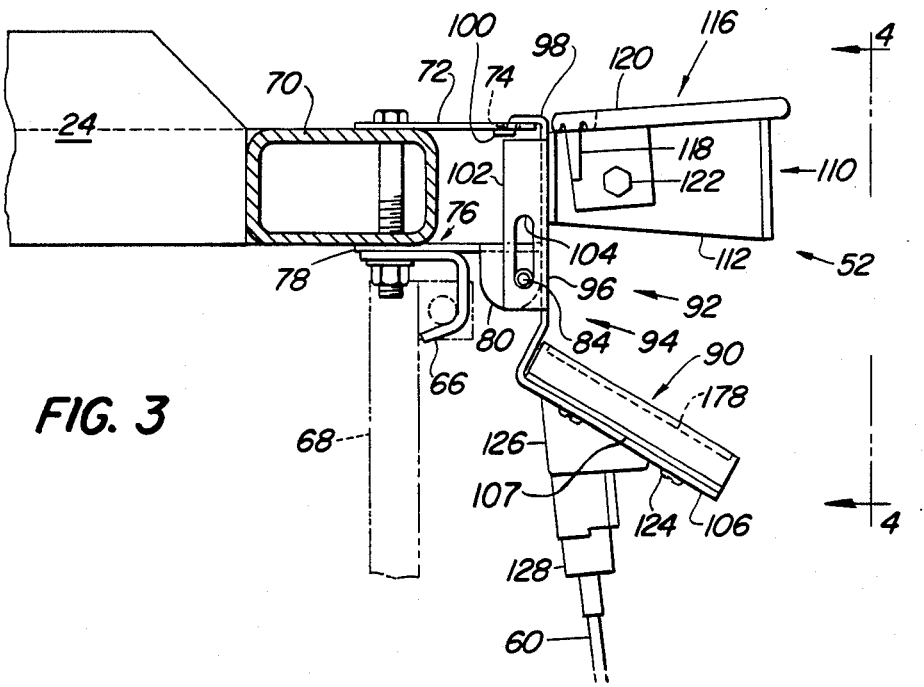
FIG. 3 is a further enlarged partial sectional view taken approximately on line 3—3 of FIG. 2 showing the mounting arrangement of one of the cleaning shoe sensors.
Figure 5:
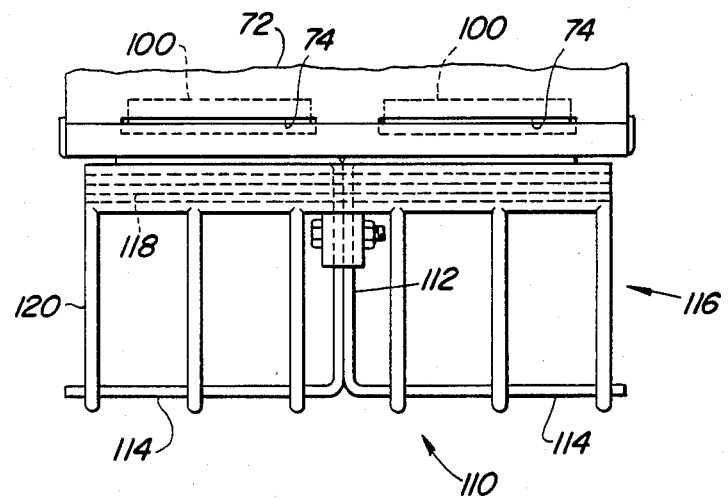
FIG. 5 is a partial overhead view approximately on line 5—5 of FIG. 4 of one of the cleaning shoe sensors.

The mounting arrangement of the cleaning shoe sensor assemblies 52 is shown in more detail in FIGS. 2-5. As seen in FIG. 2, a partial rear view of the cleaning shoe 26, a pair of sensor assemblies 52 are employed, carried by the chaffer 24 with one sensor on each side of the shoe adjacent the upright separator walls 64. Losses in the chaffer discharge tend to be higher towards its outer edges. Sampling of these portions of the material flow from the chaffer gives a reliable indication of total losses and so mounting of sensors in these locations is preferred. As indicated in FIGS. 2 and 3, it is also convenient and conventional to place other devices in this area such as for example, latches 66 for a chaffer or sieve door 68. In the past, combine operators have been expected to tolerate the inconvenient intrusion of essentially permanently fixed sensors into the cleaning shoe adjustment area, as exemplified by the above.

Each shoe sensor assembly 52 is carried on the rear frame cross member 70 of the chaffer as seen best in FIG. 3. The mounting base for each sensor consists of a pair of mounting members permanently attached to the chaffer frame member 70: an upper sensor mounting plate 72 which includes a pair of transversely aligned slots (socket means) 74 and a lower sensor mounting bracket assembly 76. In the latter, a rearwardly extending plate 78 carries a pair of spaced apart laterally aligned and downwardly depending clevises 80. In each clevis there is a latching element in which a spring 82 biases a chamfered pin 84 outwards with respect to the laterally opposite ends of the bracket assembly 76.

The shoe sensor itself 90, as can be seen in the drawings, has the shape of a relatively flat rectangular prism and is carried on a shoe sensor mounting bracket assembly 92 which includes a mounting bracket 94. In the bracket, an upright wall 96 is flanged forwardly at its top and opposite side edges. The top flange 98 is notched and offset downwards to form a pair of laterally aligned tangs 100. Each lateral flange 102 carries towards its bottom end a slot 104 (to serve as a latching element to mate with one of the spring loaded pins 84 of the bracket 76). Extending rearwardly and downwardly from the bottom of the wall 96 is a sensor mounting portion 106 for receiving the sensor mounting face 107. Each mounting portion 106 has a large central relief or notch 108 best seen in FIG. 4 in phantom outline.

A deflector assembly 110 is rigidly attached by electric resistant spot welding or other similar means to the rearward face and towards the upper edge of the wall 96. The deflector includes a central stem portion 112 extending horizontally and rearwardly from the wall 96 and oppositely extending horizontal wing portions 114, the stem portion and wings together forming a tee shape. A grate member 116 comprising a frame portion 118 and a set of parallel spaced apart fingers 120 is attached to the stem portion 112 so that the fingers extend fore-and-aft and span the space between the wall 96 and the deflector wings 114. The sensor 90 is mounted on the upper side of the mounting portion 106 and secured by suitable hardware 124 as indicated in FIG. 3. A socket arrangement 126 extends obliquely from the rear face of the sensor 90 and the sensor is mounted so that this socket 126 extends generally downwards. The socket is designed to receive a connector 128 carried by the end of harness portion 60.

The straw walker sensors are also preferably mounted in pairs with one on each outside straw walker (a typical combine has four or more side-by-side straw walkers making up a straw walker assembly 16). We need look at only one straw walker 130, the discharge end of which is shown in some detail in FIGS. 6 and 7. The walker 130 itself is somewhat box-like in structure and has a floor 132 and opposite side walls 134. A transverse bulkhead 136 extends between the walls 134 close to the discharge end 18. The bulkhead includes a pair of laterally aligned slots 138. In the straw walker application, the sensor 90 is carried on a sensor bracket 140 similar in some respects to the shoe sensor mounting bracket 94. It also carries a tee deflector assembly 110 and provision for mounting a grate member 116. The walker sensor bracket 140 also includes a pair of tangs 142, extending rearwardly and downwardly from an upright wall 144, and a rearwardly and downwardly extending mounting portion 146. The mounting surface portion 146 is also notched or relieved centrally to provide clearance for the sensor socket portion 126 and to form a pair of downwardly extending leg portions 148 which are bent rearwardly and upwardly to form foot portions 150 approximately on a level with the floor 132 of the straw walker. In the straw walker application the sensor 90 is mounted so that the socket portion 126 is directed generally horizontally and forwardly and receives connector 152 of harness portion 58.

The mounting arrangement for the straw walker sensor is completed by a straw walker sensor mounting and shielding plate 160. It has a floor 162, upwardly and outwardly sloping sides 164, a rearwardly and upwardly sloping end flange 166, and a central longitudinal upwardly opening groove 168 extending the length of the floor portion 162 to terminate adjacent the end flange 166. The forward end of the shield 160 is defined by a transverse edge 170.

A suitable assembly procedure for the cleaning shoe sensors consists of first making a subassembly by mounting on the bracket assembly 92, a sensor 90 and grate member 116. This subassembly is then mounted to the chaffer rear frame member 70 by tilting it so that the twin tangs 100 enter the slots 74 of the mounting plate 72 from above. The assembly is then swung downwards to bring the latching elements together—that is until the flanges 102 engage the pins 84. The pins are manually depressed (aided by their generous end chamfer) and the sensor assembly is swung into final position with the slots 104 registering with the pins 84 which, when released, engage the slot as shown in FIG. 3. Care will have been taken to mount the sensor 90 so that the socket 126 is properly oriented ready to receive the connector 128 of harness assembly portion 60. Any conventional and convenient means of supporting the run of this and other portions of the wiring harness may be used. Of course, slack must be provided to accommodate the conventional reciprocating motion of the chaffer 24 relative to the combine body 14.

Figure 6:
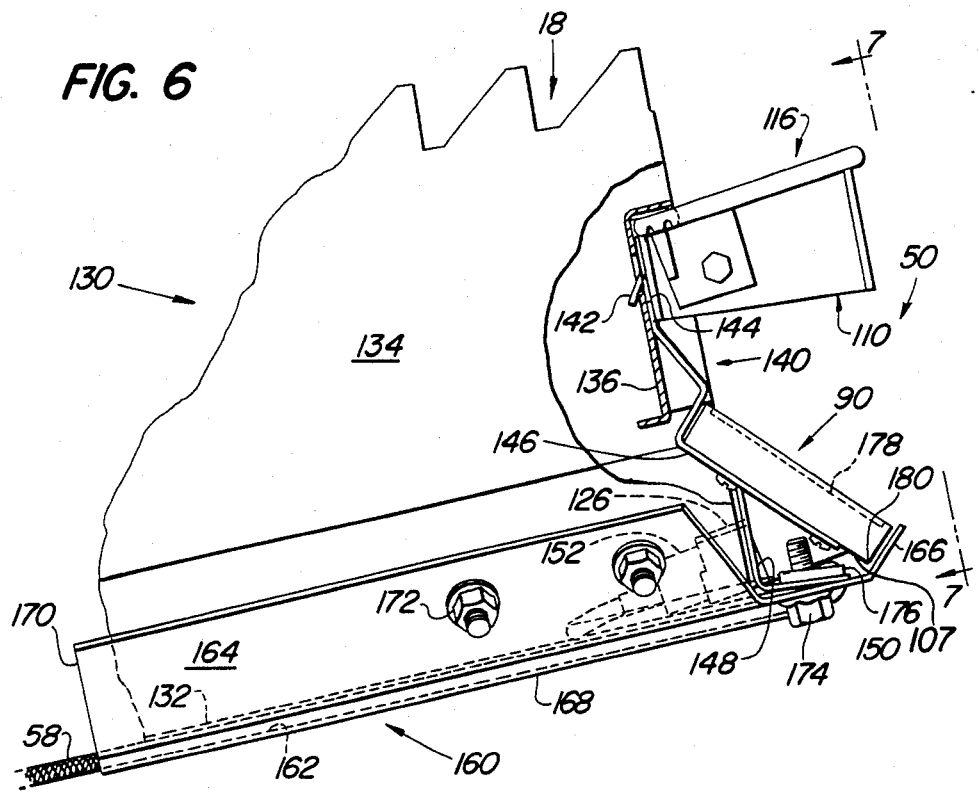
FIG. 6 is an enlarged partial side view, partially cut away, of the discharge end of one of the straw walkers showing the sensor mounting and shielding arrangement.
Figure 7:
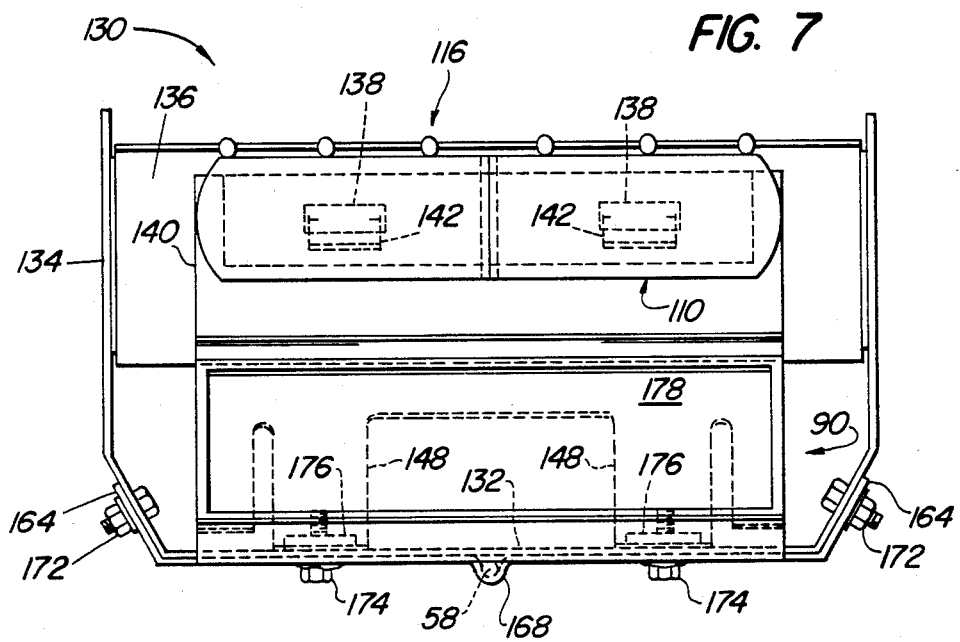
FIG. 7 is an enlarged partial rear view taken approximately along line 7—7 of FIG. 6 showing the straw walker sensor installation.

A similar subassembly is prepared for the straw walker sensor. Here the assembly is brought into engagement with the bulkheaad 136 and slid downwards so that the tangs 142 may enter the slots 138, so that the sensor assembly is supported vertically with the socket 126 oriented as shown in FIG. 6. The harness assembly portion 58 with connector 152 is brought in over the rearward edge of the straw walker floor 132 and engaged in the socket 126. Next the shield 160 may be brought into position as shown in FIG. 6, care being taken to loop the harness portion 58 in such a way that it may enter the groove 168 and be contained in the groove between the shield floor 162 and the underside of the straw walker floor 132, to emerge from the groove at the forward edge 170 of the shield 160. The shield is secured to the straw walker by suitable hardware 172. The sensor assembly is finally secured by means of machine screws 174 engaging weld nuts 176 secured to the foot portions 150 of the sensor bracket 140. As is indicated in FIG. 6, parts are dimensioned and formed so that tightening of the machine screw 174 biases the bracket 140 downwards so as to hold the tangs 142 securely in engagement with the slots 138.

In operation, both straw walker and shoe sensors function in a similar manner. At least a portion of the material being discharged rearwardly from the straw walkers or chaffer, tends to pass downwards onto the sensor sensing surface 178 (approximately parallel to the mounting face 107) and the sensor generates a signal indicative of the amount of grain being lost over the walkers or the shoe. It is conventional to use a deflecting surface such as the wings 114 here, to control somewhat the trajectory of grain kernels leaving the walker or chaffer, to deflect a greater proportion of them into contact with the sensor. However, conventional designs of deflectors have tended to collect straw and trash thus modifying the flow of material to the sensor and causing erroneous readings. In keeping with the invention, the deflector surfaces are essentially cantilevered (open ended) as in the wings 114 here, so that any material hair-pinning on the deflector wings has the opportunity to be discharged from their free ends. This is especially true when the sensor system is operated without grate members 116 which are optional attachments only and which may be advantageous in some crops and conditions.

A straw walker sensor mounting arrangement, according to the invention, is especially advantageous when operating in corn with an optional straw chopper (36) in use. Corn exemplifies a crop with relatively hard massive kernels. At least some of the kernels being lost over the straw walkers are engaged by the flails of the rotor 38 of the straw chopper so as to be projected upwards to bombard the sensor assembly 50. With the sensor 90 mounted in an optimum functional position and attitude with regard to the straw walker end, as indicated in FIG. 6, the sensor and particularly its downward and rearward edge 180 is especially vulnerable to such bombardment. The shield and mounting plate 160 serves the multiple purpose of providing an effective shield for the rearward edge 180 of the sensor, a conduit for the harness assembly portion 58, a shield for the otherwise exposed socket portion 126, and an anchoring point for the lower edge of the sensor bracket assembly 140. This secure protective mount arrangement means that the straw walker sensor may remain in position during the harvesting of all types of crops and with or without attachments such as the straw chopper which may create a particularly unfavorable environment for the sensor. The combine operator is relieved of the responsibility and inconvenience of mounting and dismounting straw walker sensors according to anticipated operating conditions. The walker sensors are always there when he needs them.

The operating environment of the shoe sensors is generally more benign so that the likelihood of mechanical damage in normal operation is much lower. However, there are some operations which the combine operator must perform relatively frequently where the presence of the sensor in the area of the rear cleaning shoe may be a hindrance. These include removal of a chaffer (or sieve) to clear blockages, or opening of and access to the chaffer door 68 and its latches 66 so that the sieve 28 may be adjusted or observed. Whenever necessary for these purposes, the shoe sensor assembly may be quickly and easily removed without tools by manually depressing the pins 84 so that the assembly can be swung rearwardly and upwardly to disengage the tangs 100 after, of course, breaking the electric connection by removing connector 128 from the socket 126.

What is claimed is:

1. In a combine harvester having a plurality of elongated reciprocating straw walkers each walker having a discharge end, a cleaning shoe including at least one reciprocating generally horizontal foraminous member having a rear discharge edge, and a grain loss monitor system including at least one first sensor carried by a straw walker adjacent its discharge end and at least one second sensor carried by the reciprocating member adjacent its discharge edge, each sensor having a sensing surface and a mounting face approximately parallel to the sensing surface, and in which threshed crop material is received by the straw walkers and conveyed rearwardly so that a first portion of material passes over their discharge ends while some grain and other small fractions of the crop material pass downwards to the cleaning shoe which processes that portion of the material so that a second portion passes over the discharge edge of the reciprocating member and at least some of the first and second portions of crop material makes an impact on the sensing surfaces of the first and second sensors respectively, the grain loss monitor system being operable to discriminate between the impacts on the sensors of kernels of grain and other materials so as to indicate a rate of loss of grain according to the amount of grain contained in the first and second portions respectively, an improved mounting arrangement for the sensors comprising:

- a socket means carried by the reciprocating member adjacent its discharge edge;
- bracket means carried by the reciprocating member adjacent its discharge edge, spaced generally vertically from the socket means, and carrying a first latching element; and
- a sensor mounting bracket having a generally upright wall, a sensor mounting surface for receiving the sensor mounting face extending rearwardly and downwardly from the base of the upright wall, and a tang extending forward from the upright wall, and carrying a second latching element for mating with the first latching element, spaced vertically from the tang so that the sensor mounting bracket may be attached to the reciprocating member by engaging the tang in the socket means and positioning the sensor mounting bracket so that the second latching element engages the first latching element to position the bracket and so that the sensor is disposed with its sensing surface directed rearwardly and upwardly, the upright wall also carrying a rearwardly extending support arm and a deflector plate spaced vertically upwards from the sensor and having opposite portions extending cantilever fashion in opposite directions from the support arm and approximately spanning the lateral extent of the sensor sensing surface.

2. The sensor mounting arrangement of claim 1 wherein the reciprocating member is a chaffer.

3. The sensor mounting arrangement of claim 1 wherein the mounting bracket further includes an open grate spanning the space between the upright wall and the top of the deflector plate so that at least a portion of the crop material engages the grate and is carried rearwardly of the deflector plate.

4. The sensor mounting arrangement of claim 2 and further including a second sensor mounting bracket and wherein one bracket is disposed adjacent each opposite lateral side of the chaffer.

5. The sensor mounting arrangement of claim 1 wherein the latching elements include a pair of opposed laterally extending coaxial spring loaded pins.

6. In a combine harvester having a plurality of elongated reciprocating straw walkers each walker having a discharge end, a cleaning shoe including at least one reciprocating generally horizontal foraminous member having a rear discharge edge, and a grain loss monitor system including at least one first sensor carried by a straw walker adjacent its discharge end and at least one second sensor carried by the reciprocating member adjacent its discharge edge, each sensor having a sensing surface and a mounting face approximately parallel to the sensing surface, and in which threshed crop material is received by the straw walkers and conveyed rearwardly so that a first portion of material passes over their discharge ends while some grain and other small fractions of the crop material pass downwards to the cleaning shoe which processes that portion of the material so that a second portion passes over the discharge edge of the reciprocating member and at least some of the first and second portions of crop material makes an impact on the sensing surfaces of the first and second sensors respectively, the grain loss monitor system being operable to discriminate between the impacts on the sensors of kernels of grain and other materials so as to indicate a rate of loss of grain according to the amount of grain contained in the first and second portions respectively, an improved mounting arrangement for the sensors comprising:

- a socket means carried by the reciprocating member adjacent its discharge edge;
- bracket means carried by the reciprocating member adjacent its discharge edge, spaced generally vertically from the socket means, and carrying a first latching element; and
- a sensor mounting bracket having a generally upright wall, a sensor mounting surface for receiving the sensor mounting face extending rearwardly and downwardly from the base of the upright wall, and a tang extending forward from the upright wall, and carrying a second latching element for mating with the first latching element, spaced vertically from the tang so that the sensor mounting bracket may be attached to the reciprocating member by engaging the tang in the socket means and positioning the sensor mounting bracket so that the second latching element engages the first latching element to position the bracket and so that the sensor is disposed with its sensing surface directed rearwardly and upwardly; and
- a walker sensor mounting bracket assembly carried by a straw walker and having a rearwardly and downwardly sloping sensor mounting surface for receiving a sensor mounting face and a shield member included in the mounting bracket assembly extending rearwardly from the discharge end of the straw walker and having a rearwardly and upwardly sloping flange disposed so that when a sensor is mounted on the sensor mounting surface, said flange is closely adjacent an edge of the sensor to shield it from below.

7. The mounting arrangement of claim 6 wherein the straw walker sensor shield member includes a floor portion substantially forwardly overlapping the underside of the discharge end of the straw walker and wherein said floor portion includes a longitudinally extending groove opening upwards for receiving an electrical harness portion connected to a mounted sensor and holding it between the underside of the straw walker and the shield so as to shield the wire from mechanical damage.

* * * * *